US012595829B2

(12) United States Patent　　　　(10) Patent No.:　　US 12,595,829 B2
Shahin　　　　　　　　　　　　　　　(45) Date of Patent:　　　　Apr. 7, 2026

(54) SHIM FOR A VEHICLE BRAKE PAD HAVING HEAT DISSIPATION PORTIONS

(71) Applicant: HL MANDO CORPORATION, Pyeongtaek-si (KR)

(72) Inventor: Hatem Shahin, Pfaffenhofen (DE)

(73) Assignee: HL MANDO CORPORATION, Pyeongtaek-si (KR)

( * ) Notice: Subject to any disclaimer, the term of this patent is extended or adjusted under 35 U.S.C. 154(b) by 378 days.

(21) Appl. No.: 18/197,875

(22) Filed: May 16, 2023

(65) Prior Publication Data

US 2023/0366440 A1　　Nov. 16, 2023

(30) Foreign Application Priority Data

May 16, 2022　(DE) .......................... 102022204757.5

(51) Int. Cl.
　　F16D 65/097　　　　(2006.01)
(52) U.S. Cl.
　　CPC ................................ F16D 65/0971 (2013.01)
(58) Field of Classification Search
　　CPC .. F16D 65/092; F16D 65/0971; F16D 65/095; F16D 65/847
　　USPC ....................................................... 188/71.6
　　See application file for complete search history.

(56) References Cited

U.S. PATENT DOCUMENTS

| | | | | |
|---|---|---|---|---|
| 3,848,708 A | * | 11/1974 | Noguchi | F16D 65/092 |
| | | | | 188/73.1 |
| 4,230,207 A | * | 10/1980 | Stahl | F16D 65/02 |
| | | | | 188/73.1 |

| | | | | |
|---|---|---|---|---|
| 4,240,530 A | * | 12/1980 | Tillenburg | F16D 65/092 |
| | | | | 188/264 G |
| 4,660,685 A | * | 4/1987 | Thacker | F16D 65/092 |
| | | | | 188/73.37 |
| 4,775,036 A | * | 10/1988 | Harrison | B61H 5/00 |
| | | | | 188/73.1 |

(Continued)

FOREIGN PATENT DOCUMENTS

| | | |
|---|---|---|
| DE | 8334243 U1 | 5/1984 |
| DE | 19754740 A1 | 3/1999 |

(Continued)

OTHER PUBLICATIONS

Office Action issued in corresponding German Patent Application No. 10 2022 204 757.5 dated Mar. 14, 2023.

*Primary Examiner* — Henry Y Liu
(74) *Attorney, Agent, or Firm* — LEE, HONG, DEGERMAN, KANG & WAIMEY

(57)　　　　　　　ABSTRACT

The invention relates to a shim and to a brake pad assembly for a vehicle disc brake, wherein the vehicle disc brake comprises a brake disc that is configured to rotate about a rotation axis and the brake pad assembly comprises:

a backplate that is configured to carry a friction material lining at its front face for contacting the brake disc;

a shim that is arranged at a rear face of the backplate;

wherein the shim has a radially upper edge and a radially lower edge and the radially upper edge and the radially lower edge are connected by two opposite side portions of the shim;

wherein the shim has at least one laterally protruding heat dissipation portion that is comprised by one of the side portions and that protrudes past a side edge of the backplate.

11 Claims, 9 Drawing Sheets

(56) References Cited

U.S. PATENT DOCUMENTS

| | | | | |
|---|---|---|---|---|
| 5,099,962 A * | 3/1992 | Furusu | F16D 65/092 | 188/251 A |
| 5,332,067 A * | 7/1994 | Prud'homme | F16D 65/84 | 188/264 G |
| 5,396,972 A * | 3/1995 | Grele | F16D 69/0408 | 188/250 G |
| 5,535,860 A * | 7/1996 | Hummel | F16D 65/0006 | 188/250 G |
| 5,706,917 A * | 1/1998 | Matsuzaki | F16D 65/0977 | 188/73.38 |
| 5,762,166 A * | 6/1998 | Yano | F16D 65/0006 | 188/264 G |
| 5,842,546 A * | 12/1998 | Biswas | F16D 65/092 | 188/73.1 |
| 6,056,091 A * | 5/2000 | Krug | F16D 65/0006 | 188/250 G |
| 6,105,736 A * | 8/2000 | Akita | F16D 65/0006 | 188/251 A |
| 6,116,384 A * | 9/2000 | Matsumoto | F16D 65/0971 | 188/73.31 |
| 6,170,620 B1 * | 1/2001 | Akita | F16D 65/0971 | 188/251 A |
| 6,213,257 B1 * | 4/2001 | Yano | F16D 65/0971 | 188/73.37 |
| 6,257,379 B1 * | 7/2001 | Matsumoto | F16D 65/183 | 188/73.31 |
| 6,283,258 B1 * | 9/2001 | Chen | F16D 65/092 | 188/264 G |
| 6,913,120 B2 * | 7/2005 | Bosco | F16D 65/092 | 188/250 G |
| 6,955,247 B2 * | 10/2005 | Renauld | F16D 65/0971 | 188/73.36 |
| 7,032,723 B2 * | 4/2006 | Quaglia | F16F 7/104 | 188/250 F |
| 7,097,008 B2 * | 8/2006 | Pham | F16D 65/0971 | 188/261 |
| 8,657,081 B2 * | 2/2014 | Chung | F16D 65/0972 | 188/250 G |
| 8,925,690 B2 * | 1/2015 | Ogawa | F16D 65/095 | 188/73.31 |
| 9,140,322 B2 * | 9/2015 | Kobayashi | F16D 65/095 | |
| 9,239,088 B2 * | 1/2016 | Roehling | F16D 65/092 | |
| 9,267,557 B2 * | 2/2016 | Boyle | F16D 55/227 | |
| 9,291,225 B2 * | 3/2016 | Arbesman | F16D 69/0408 | |
| 9,360,067 B1 * | 6/2016 | Arbesman | F16D 69/04 | |
| 9,651,102 B2 * | 5/2017 | Hoxie | F16D 65/0006 | |
| 9,664,244 B2 * | 5/2017 | Osada | F16D 65/0971 | |
| 9,670,976 B2 * | 6/2017 | Arbesman | F16D 65/095 | |
| 10,119,583 B2 * | 11/2018 | Maestrini | F16D 66/02 | |
| 10,316,911 B2 * | 6/2019 | Arbesman | F16D 69/0408 | |
| 10,352,384 B2 * | 7/2019 | Satoh | F16D 65/092 | |
| 10,598,236 B2 * | 3/2020 | Tamaoki | B32B 15/01 | |
| 10,724,588 B2 * | 7/2020 | Signoriello | F16D 69/04 | |
| 10,794,439 B2 * | 10/2020 | Carney | F16D 65/092 | |
| 10,851,858 B2 * | 12/2020 | Satoh | F16D 65/0971 | |
| 11,300,167 B2 * | 4/2022 | Ahn | F16D 55/02 | |
| 11,536,335 B2 * | 12/2022 | Foster | F16D 69/04 | |
| 11,746,840 B2 * | 9/2023 | Divakaruni | F16D 65/095 | 188/73.37 |
| 11,885,383 B2 * | 1/2024 | Sato | F16D 65/0006 | |
| 2004/0074712 A1 * | 4/2004 | Quaglia | F16D 65/0018 | 188/73.35 |
| 2006/0027427 A1 * | 2/2006 | Anda | F16D 65/0006 | 188/73.1 |
| 2009/0223753 A1 * | 9/2009 | Kappagantu | F16D 65/0006 | 188/72.1 |
| 2012/0298457 A1 * | 11/2012 | Ogawa | F16D 65/095 | 188/72.4 |
| 2012/0318621 A1 * | 12/2012 | Teagan | F16D 55/225 | 188/71.6 |
| 2013/0319801 A1 * | 12/2013 | Huang | F16D 65/847 | 188/72.4 |
| 2015/0053517 A1 * | 2/2015 | Arbesman | F16D 65/095 | 188/251 A |
| 2015/0354646 A1 * | 12/2015 | Osada | F16D 65/0971 | 188/73.37 |
| 2016/0146276 A1 * | 5/2016 | Kobayashi | F16D 65/0971 | 188/250 F |
| 2016/0160944 A1 * | 6/2016 | Arbesman | F16D 65/092 | 188/251 A |
| 2016/0195147 A1 * | 7/2016 | Carney | F16D 65/0006 | 29/592 |
| 2017/0138424 A1 * | 5/2017 | Maestrini | F16D 65/0971 | |
| 2017/0191540 A1 * | 7/2017 | Ishikawa | F16D 65/38 | |
| 2018/0283479 A1 * | 10/2018 | Tamaoki | F16D 65/0006 | |
| 2019/0063523 A1 * | 2/2019 | Signoriello | F16D 65/0006 | |
| 2019/0128349 A1 * | 5/2019 | Clent | F16D 65/0006 | |
| 2021/0148421 A1 * | 5/2021 | Ahn | F16D 55/02 | |
| 2022/0042562 A1 * | 2/2022 | Sato | F16D 65/0006 | |
| 2022/0381305 A1 * | 12/2022 | Divakaruni | F16D 65/095 | |

FOREIGN PATENT DOCUMENTS

| | | |
|---|---|---|
| DE | 60006887 T2 | 5/2004 |
| DE | 102010004012 A1 | 8/2010 |
| EP | 4060202 A1 | 9/2022 |
| GB | 2523090 A | 8/2015 |
| JP | 3815695 B2 | 8/2006 |
| KR | 20-0281974 Y1 | 9/2002 |

* cited by examiner

SHIM FOR A VEHICLE BRAKE PAD HAVING HEAT DISSIPATION PORTIONS

CROSS-REFERENCE TO RELATED APPLICATION

This application is based on and claims priority under 35 U.S.C. § 119 to German Patent Application No. 102022204757.5 filed on May 16, 2022 in the German Patent and Trade Mark Office, the disclosures of which are incorporated herein by reference.

TECHNICAL FIELD

The invention relates a brake pad assembly comprising a shim and to a shim. The brake pad assembly and the shim are intended for a vehicle disc brake.

BACKGROUND

The vehicle may be a road vehicle, such as a truck, a car or a bus. Shims are widely used in disc brake systems and may also be referred to as damping discs, damping plates or damping sheets. The shims are planar members adhered to or mechanically fixed to a rear side of a brake pad backplate. The backplate is a rigid metallic member that carries a friction material lining at its front face.

The shims prevent a direct contact (in particular a hard metallic contact) between the backplate and a brake piston or a brake caliper of the vehicle disc brake. This helps to limit vibrations when braking, thereby reducing the generation of acoustic noises. One example of a shim for a vehicle disc brake can be found in DE 10 2010 004 012 B4.

During braking, significant amounts of friction heat are generated with e.g. the brake disc or brake pad reaching temperatures of more than 100° C., e.g. 400° C. or more. This heat is conducted by and spreads within the components of the vehicle disc brake.

Several problems may result from this heat. For example, the components of the vehicle disc brake may experience non-uniform heating which may generate to stresses and/or deformations. Also, heat can reach the brake fluid that is in contact with a brake piston. This is undesired for safety reasons.

SUMMARY

It is an object of the invention to limit at least some of these disadvantages and improve heat management within vehicle disc brakes.

This object is solved by the subject matter according to the attached independent claims. Advantageous embodiments are defined in the dependent claims and in this description.

Accordingly, a brake pad assembly for a vehicle disc brake is disclosed, wherein the vehicle disc brake comprises a brake disc that is configured to rotate about a rotation axis and the brake pad assembly comprises:

a backplate that is configured to carry a friction material lining at its front face for contacting the brake disc;
a shim that is arranged at a rear face of the backplate.

The shim has a radially upper edge and a radially lower edge, the radially upper edge and the radially lower edge being connected by two opposite side portions. The shim has at least one laterally protruding heat dissipation portion that may extend along a (e.g. virtual and/or spatial) plane comprising the rear face. The heat dissipation portion is comprised by one of the side portions and protrudes past (or, in other words, protrudes with respect to) a side edge of the backplate.

With such a configuration, the shim may be configured to conduct significant amounts of heat received from the backplate and especially the friction material in a lateral direction. Accordingly, it may conduct the heat tangentially with respect a displacement axis of the brake pad, instead of along said displacement axis and towards the brake piston. Heat received by the shim may thus be dissipated to a larger degree than in existing systems instead of reaching the brake fluid. In this context, the heat dissipation portion increases a surface area of the shim for heat dissipation and/or protrudes so as to conduct heat in a direction away from the shim's centre (i.e., from the portion of the shim contacted by the brake piston).

Moreover, if protruding past a side edge of the backplate, the heat dissipation portion may define a large surface that is in contact with air. For example, said protruding part may form a free end of the heat dissipation portion that does not contact any further components. This way, significant amounts of heat can be emitted into the surroundings instead of reaching the brake fluid.

The heat dissipation portion represents an inexpensive means that is simple to produce and only adds limited weight. At the same time, it provides an efficient heat dissipation effect.

Directional references, such as axial, circumferential or radial, may refer to the rotation axis. An axial direction extends along the rotation axis, a radial direction extends orthogonally thereto and a circumferential direction extends about the rotation axis. A displacement axis of the brake pad along which the brake pad moves during braking may equally be referred to herein. The shim, the backplate and/or the friction material lining may generally extend orthogonally to said displacement axis. The displacement axis may extend in parallel to the rotation axis.

An extension along a certain member or feature may include an extension in parallel to said member or feature. It may also include an extension at a slight angle to said member or feature of e.g. less than 45°. Specifically, a direction component or a vectorial component of said extension running in parallel to said member or feature may exceed a respective component running orthogonally to said member or feature.

The upper and lower edge may each extend along a circumferential direction and/or at an angle to a radial direction or to the displacement axis (said angle e.g. being more than 40°). The side portions, to the contrary, may extend along a radial direction and/or at an angle to a circumferential direction or to the displacement axis (said angle e.g. being more than 40°).

The upper and lower edge may be connected to or merge with the side portions at corner portions of the shim. At these corner portions, a circumferential direction may change by more than 20° or more than 40° (e.g. up to and including 90°). The upper and lower edge as well as the side portions may confine or enclose an outline or footprint of the shim and/or a surface area thereof. The side portions may be mirror-symmetric to one another. They may each comprise or form a side edge of the shim.

The backplate, the disc brake and the friction material lining may be configured according to known examples. The shim may be thinner (i.e., have a lower material strength) than the backplate and the friction material lining. The shim may be made from a material (e.g. a metallic material or a rubber material) that is different from a material of the backplate and of the friction material lining. The shim may be a thin plate, a layer or a disc. The shim may be elongated in or along a circumferential direction. Its width in or along a radial direction may be less than its length in or along said circumferential direction, e.g. less than two thirds or less than half of said length.

The surface area of the heat dissipation portion may comprise at least 5%, at least 10% or at least 20% of the total surface area of the shim. It may be less than 25%. A length of the heat dissipation portion in an elongated direction of the shim (e.g. along the circumferential direction) may be at least 10% or at least 20% of a total length of the shim, e.g. up to one third of said total length. By dimensioning the heat dissipation portion accordingly, a significant heat dissipation effect can be achieved, while still limiting size and weight.

The shim may be adhered and/or mechanically fixed to the backplate. The mechanical fixation may include engagement arms and clamping sections that engage with an outer edge of the backplate. These engagement arms or clamping sections may be different from any of the heat dissipation portions disclosed herein, e.g. in terms of their smaller size or different position compared to said heat dissipation portions.

The heat dissipation portion may be elongated. Its dimension orthogonally to a radial direction (i.e. its length) may exceed its dimension along said radial direction (i.e. its width).

The heat dissipation portion may form a local projection not extending along the complete length or the side portion. Put differently, the heat dissipation portion may only cover and/or only extend along a limited section of said side portion and/or only define a limited section of a side edge of the shim. This may limit weight and size. Further, this allows for selecting the position of the heat dissipation portion along the side portion so as to avoid collisions with other components of the vehicle disc brake.

It is, however, equally possible that the heat dissipation portion extends along the complete length of the side portion and/or defines the complete length of a side edge.

Generally, the backplate may equally have an upper and lower edge as well as a side portions that run adjacent to and/or along the upper and lower edges as well as the side portions of the shim.

According to one embodiment, the heat dissipation portion extends orthogonally to a radial direction and/or extends along a circumferential direction of the brake disc. For example, the heat dissipation portion main form a laterally or a sideways extending projection at a side portion of the shim and/or extending towards a guiding recess of a brake caliper in which the brake pad is guided and received. The heat dissipation portion may overlap with guiding projections provided at the side portions of the backplate, said guiding projections being receivable in the above-mentioned guiding recess.

In one example, the heat dissipation portion is planar. For example, the shim may have a planar main body and the heat dissipation portion may extend in the same plane as said main body. The main body may define a main surface area or main volume of the shim. It may completely overlap with the backplate.

In one embodiment, the shim has at least two heat dissipation portions, one at each of the side portions. This way, heat may be conducted away from a central contact portion of the shim to the brake piston and instead towards both of the side portions of the shim.

In another embodiment, the shim has at least two heat dissipation portions at one common side portions. For example, the heat dissipation portions may be radially spaced apart from another, with one forming a radially upper and the other forming a radially lower heat dissipation portion.

It may generally be provided that the shim is free of any heat dissipation portion at its radially upper or radially lower edges. It has been of observed that near said upper and lower edge, the proximity to adjacent components of the vehicle brake disc (e.g. the brake caliper) may limit a collision-free length of the heat dissipation portions. Therefore, heat dissipation may not be as effective of the heat dissipation portions were to extend e.g. radially from and/or past said edges.

According to one example, the shim has at least two heat dissipation portions that differ in terms of dimensions and/or surface area. This may be another way of increasing the flexibility in designing the shim, e.g. to ensure that the shim stays free of collisions while still providing a significant heat dissipation effect.

In one example, the shim is a one-piece or, in other words, an integral member. For example, the shim may be formed from a homogeneous material. It may e.g. be produced by cutting or punching, in particular from a metal sheet or rubber sheet.

The invention also relates to a shim for a brake pad assembly according to any of the previous claims. This shim is configured to be arranged at a rear face of the backplate. The shim has a radially upper edge and a radially lower edge, the radially upper edge and the radially lower edge being connected by two opposite side portions. Also, the shim has at least one laterally protruding heat dissipation portion that may extend along a (e.g. virtual and/or spatial plane) comprising the rear face. The heat dissipation portion is comprised by one of the side portions and protrudes past a side edge of the backplate.

BRIEF DESCRIPTION OF DRAWINGS

Embodiments of the invention are discussed with respect to the attached schematic figures. Throughout said figures, same reference signs may be used for same or similar features.

DETAILED DESCRIPTION

Figure 1:
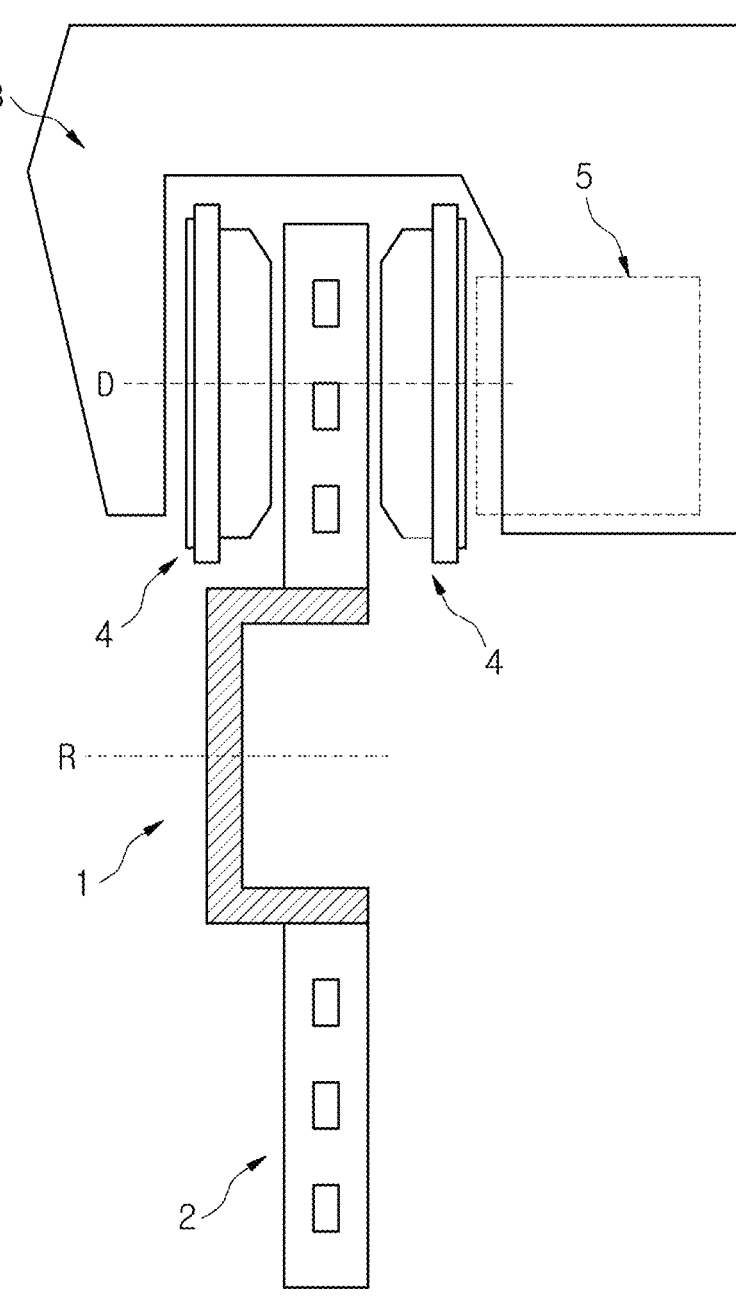
FIG. 1 is a sectional view of a vehicle disc brake comprising a brake pad assembly according to the prior art.

FIG. 1 shows a vehicle disc brake 1 that is generally configured according to known configurations, apart from the shim 14 discussed below.

The vehicle disc brake 1 comprises a brake disc 2 that rotates about a rotation axis R. The sectional plane of FIG. 1 comprises said rotation axis R. The vehicle disc brake 1 further comprises a brake caliper 3 spanning from one side face of the brake disc 2 to another opposite side face. The brake caliper 3 carries two brake pad assemblies 4. These are arranged adjacent to the opposite side faces of the brake disc 2, so as to clamp the brake disc 2 in between them. This is accomplished by displacing the brake pads 4 along a displacement axis D which runs in parallel to the rotation axis R. More specifically, a brake piston 5 presses the (in FIG. 1) right brake pad assembly 4 into contact with the respectively adjacent side face of the brake disc 2. According to known floating caliper principles, the (in FIG. 1) left brake pad assembly 4 is thus pressed into contact with the opposite side face of the brake disc 2 as well.

Figure 2:
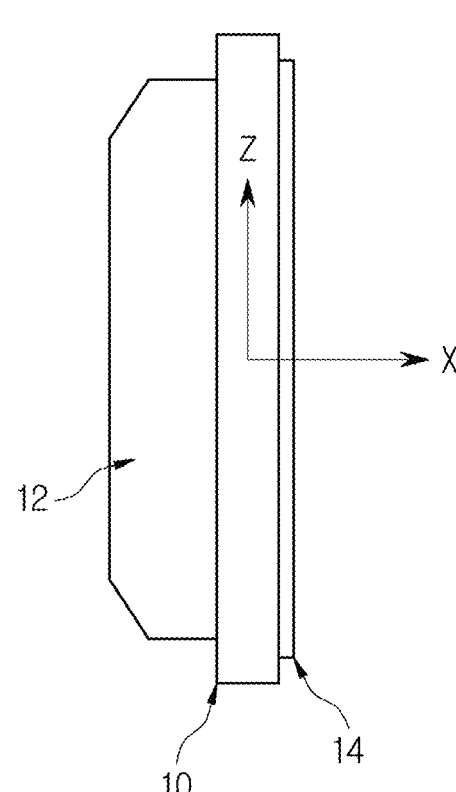
FIG. 2 is a side view of the brake pad of FIG. 1.

FIG. 2 shows the right brake pad 4 of FIG. 1 in greater detail. The brake pad assembly 4 comprises a planar plate-shaped backplate 10. At a front face of said brake pad 10 which faces the brake disc 2, a friction material lining 12 is provided. An optional not illustrated underlayer can be arranged in between the friction material lining 12 and the brake pad 10. The friction material may be configured according to known examples and is generally different from the material of the backplate 10.

At a rear face of the backplate 10, a shim 14 is provided. The shim 14 is contacted by the brake piston 5 when presses the brake pad 4 into contact with the brake disc 2. The shim 14 is a thin planar and sheet-like member.

Figure 3:
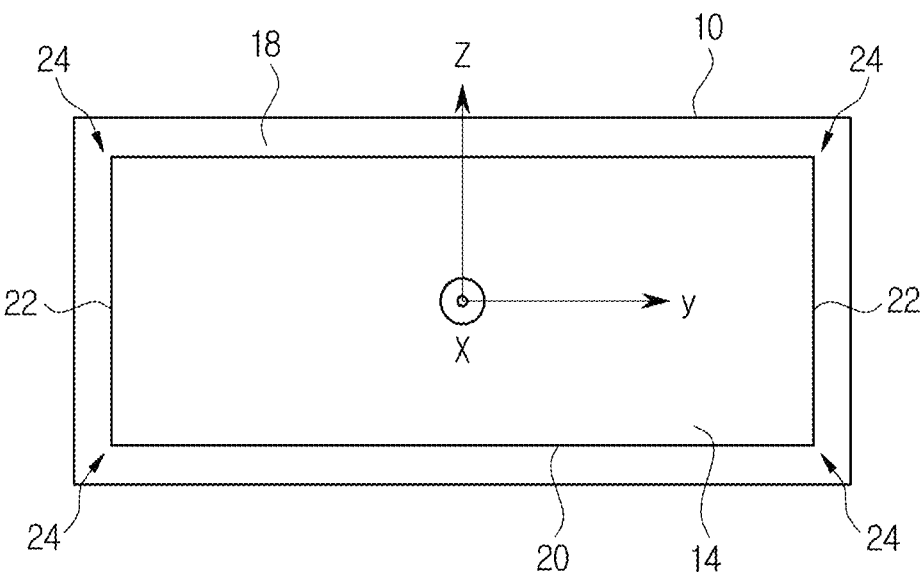
FIG. 3 is a front view of said brake pad's rear side.

As indicated by a respectively adjusted orientation of the depicted coordinate system, FIG. 3 is a rear view of the backplate 10 of FIG. 2. It can be seen that the shim 14 covers a large area of said rear face of the backplate 10. The shim 14 comprises a radially upper edge 18, a radially lower edge 20 and two side portions 22 each connecting the radially upper edge 18 and radially lower edge 20. These connections between occur in corner portion 24 of the shim 14.

The backplate 10 also has a radially upper edge, a radially lower edge and two side portions which extend along the respective edges and portions 18, 20, 22 of the shim 14. The rectangular outline of the backplate 10 and the shim 14 is only by way of example and different shapes of the edges and side portions 22, e.g. curved or polygonal, may be provided.

The X-axis of FIG. 3 extends along a circumferential direction, the Z-axis extends in a radial direction. The shim 14 is elongated and the circumferential direction and narrower in the radial direction.

The brake piston 5 contacts the shim 14 in its central portion, e.g. where the coordinate system of FIG. 3 is located. Friction heat that is generated at the friction material lining 22 is conducted by the backplate and the shim 14 to said brake piston 5. From there, it may reach a brake fluid that is in contact with and displaces the brake piston 5.

FIGS. 4 to 9 show embodiments of the shim 14 according to the present invention. In each of these embodiments a heat dissipation portion 26 is provided at each of the side edges 22 of the shim 14. The heat dissipation portions 26 are integral part of the generally one-piece shim 14 and extend in the same plane therewith. The heat dissipation portions 26 thus likewise extend along and in particular in parallel to a rear face of the backplate 10.

Figure 4:
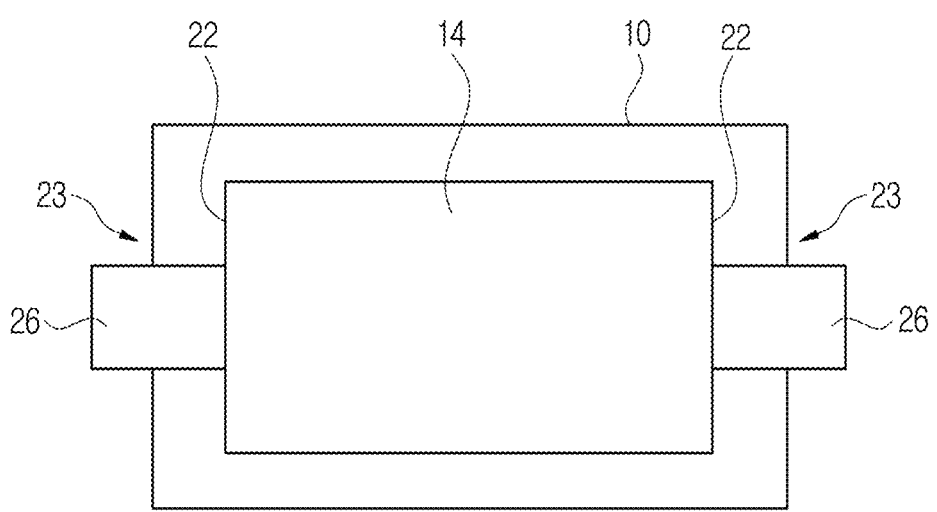
FIGS. 4-9 are views similar to FIG. 3 but with shims according to embodiments of the invention.
Figure 5:
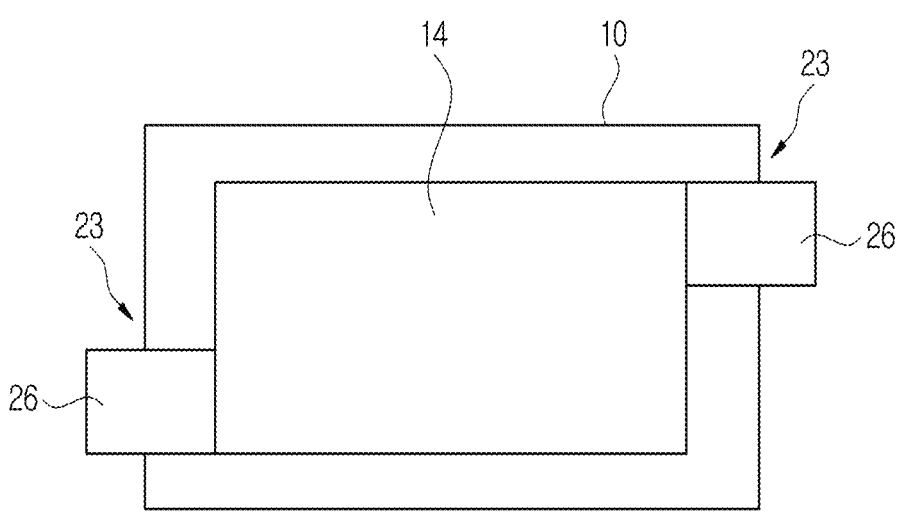

The heat dissipation portions 26 of FIGS. 4, 5 as well as 8 and 9 form elongated projections or fingers. These extend along only part of the (e.g. radial) length of the side portions 22. The heat dissipation portions 26 project in a circumferential direction and thus project laterally. They also extend further sideways than the backplate 10. Differently put, the heat dissipation portions 26 laterally project past the side edges 23 of the backplate 10.

Figure 6:
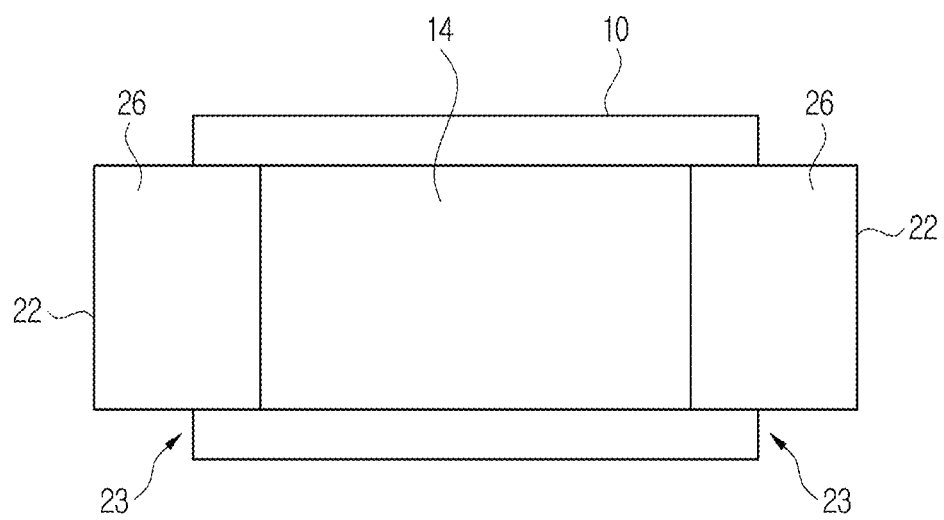
Figure 7:
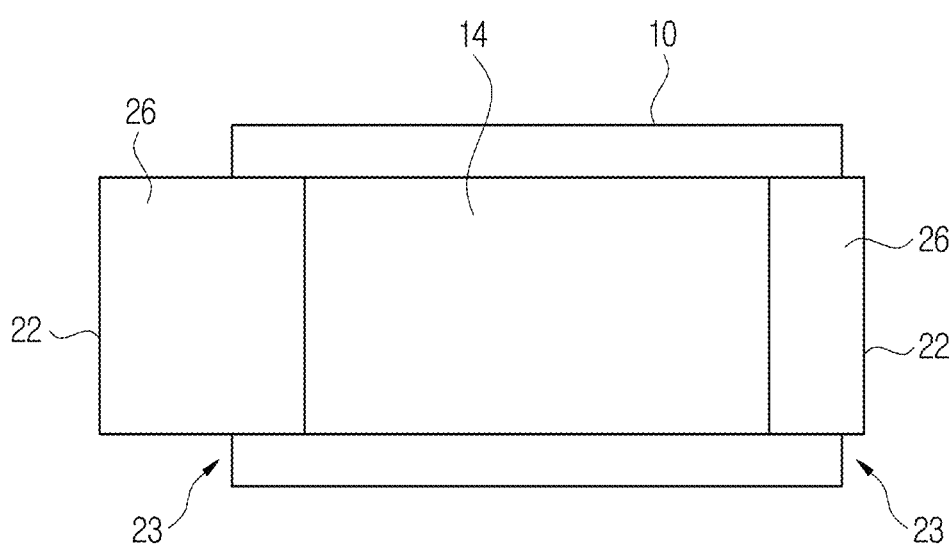
Figure 8:
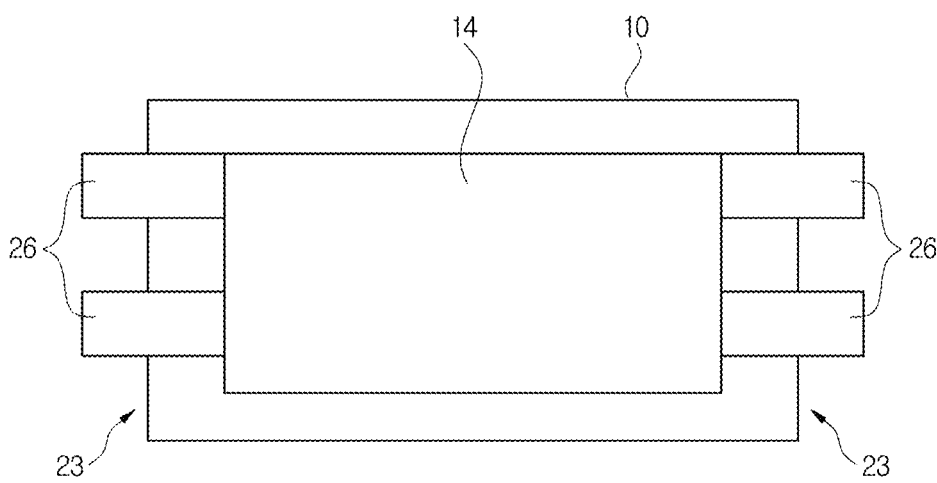
Figure 9:
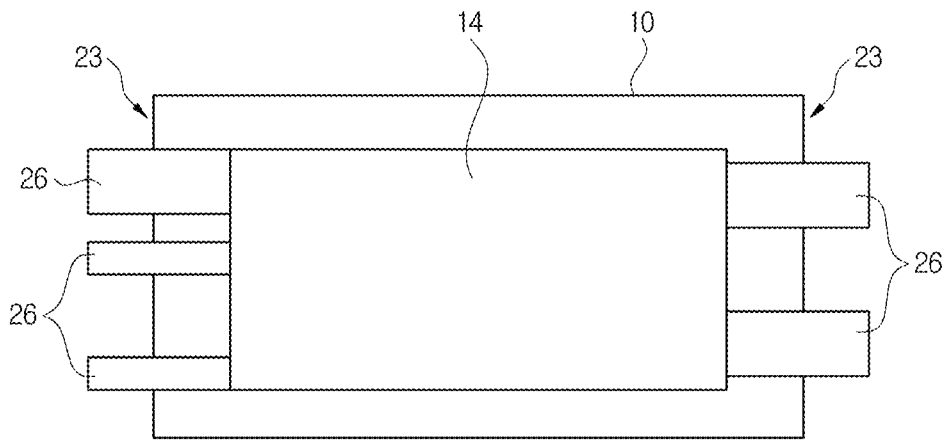

In FIGS. 6 and 7, the heat dissipation portions 26 also protrude laterally and laterally project past the side edges 23 of the backplate 10. In these cases, however, the heat dissipation portions 26 extend along the complete length of the side portions 26 of the shim 14. More precisely, the heat dissipation portions 26 comprise the complete side edges of the shim 14 and displace them laterally away from the backplate 10.

FIGS. 4 to 9 indicate the variability for sizing and positioning the heat dissipation portions 26. For example, these can be placed at different heights along the side portions 22 (see FIGS. 5 and 9) or may have different surface areas (see FIGS. 7 and 9).

What is claimed is:

1. Brake pad assembly for a vehicle disc brake, wherein the vehicle disc brake comprises a brake disc that is configured to rotate about a rotation axis and the brake pad assembly comprises:
   a backplate that is configured to carry a friction material lining at its front face for contacting the brake disc;
   a shim that is arranged at a rear face of the backplate;
   wherein the shim has a radially upper edge and a radially lower edge and the radially upper edge and the radially lower edge are connected by two opposite side portions of the shim;
   wherein the shim has at least one laterally protruding heat dissipation portion that is comprised by one of the side portions and that protrudes past a side edge of the backplate,
   wherein the heat dissipation portion does not contact any further components of the vehicle disc brake.

2. Brake pad assembly according to claim 1, wherein the heat dissipation portion extends orthogonally to a radial direction or extends along a circumferential direction of the brake disc.

3. Brake pad assembly according to claim 1, wherein each side portion of the shim comprises at least one heat dissipation portion.

4. Brake pad assembly according to claim 1, wherein at least one side portion has at least two heat dissipation portions.

5. Brake pad assembly according to claim 1, wherein the shim is free of any heat dissipation portion at its radially upper or radially lower edge.

6. Brake pad assembly according to claim 1, wherein the shim has at least two heat dissipation portions that differ in terms of dimensions or surface area.

7. Brake pad assembly according to claim 1, wherein the shim is a one-piece member.

8. Brake pad assembly according to claim 1, wherein the shim is made from a material that is different from a material of the backplate and of the friction material lining.

9. Brake pad assembly according to claim 8, wherein the shim is made from a rubber material.

10. Brake pad assembly according to claim 8, wherein the shim is made from a metallic material.

11. Brake pad assembly according to claim 1, wherein a surface area of the heat dissipation portion comprises at least 5% of a total surface area of the shim.

* * * * *